United States Patent
Onufryk et al.

(10) Patent No.: US 7,167,997 B1
(45) Date of Patent: Jan. 23, 2007

(54) APPARATUS AND METHOD FOR LIMITING DATA TRANSMISSION RATES

(75) Inventors: Peter Z. Onufryk, Flanders, NJ (US); Inna Levit, Sunnyvale, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 412 days.

(21) Appl. No.: 10/767,964

(22) Filed: Jan. 29, 2004

(51) Int. Cl.
 *G06F 5/06* (2006.01)
 *G06F 1/04* (2006.01)
(52) U.S. Cl. .................. 713/600; 713/501; 713/503
(58) Field of Classification Search ............. 713/500, 713/501, 503, 600
See application file for complete search history.

(56) References Cited

U.S. PATENT DOCUMENTS 4,596,026 A * 6/1986 Cease et al. ............... 375/372
5,701,514 A * 12/1997 Keener et al. .............. 710/14
6,658,582 B1 * 12/2003 Han .......................... 713/500

* cited by examiner

*Primary Examiner*—Thuan Du
(74) *Attorney, Agent, or Firm*—Kenneth Glass; Glass & Associates

(57) ABSTRACT

A rate limiting circuit for data stream transmissions provides a generated clock signal to a buffer interposed between source and destination components so as to programmably adjust the maximum rate that data can be passed through the buffer. A counter is incremented by one each $(1+RL_{max})$ cycles of a clock signal, where $RL_{max}$ is the larger of a user programmable value (RL) and a manufacturer one-time programmed value (SERL). A controller receiving a request to access the buffer for a read or write operation, checks the count of the counter before activating the access enable line. If the count is greater than zero, then the controller activates the access enable line while decrementing the counter by one. If the count is zero, however, then the controller waits until the count is greater than zero before activating the access enable line to grant the request.

41 Claims, 3 Drawing Sheets

US 7,167,997 B1

APPARATUS AND METHOD FOR LIMITING DATA TRANSMISSION RATES

FIELD OF THE INVENTION

The present invention generally relates to controlling the rate of data transmissions in and between computer systems and in particular, to an apparatus and method for limiting data transmission rates.

BACKGROUND OF THE INVENTION

As data is being transmitted in a computer system (or between computer systems), it is desirable at times to be able to adjust the rate that the data is being transmitted. In the case where a buffer is used for synchronization purposes such as when the source and destination of a data transmission are running under asynchronous clock signals, the data transmission rate may be controlled by controlling the rate that data is written into or read from the buffer.

In common applications, the rate that data is written into a buffer is controlled by the source clock signal, and the rate that data is read from the buffer is controlled by the destination clock signal. Such an arrangement accommodates situations where the source and destination clock signals are asynchronous, as well as where the source and destination clock signals are of different frequencies.

In more complex applications, however, where it may take several clock cycles to process data at the destination, it may be desirable to slow down reading data from the buffer by using a rate less than the destination clock frequency or alternatively, writing data to the buffer by using a rate less than the source clock frequency in order to avoid overflow conditions at the receiving end or in the buffer.

In addition, or alternatively, where the number of clock cycles to process data varies depending upon the nature or characteristics of the data being processed, or the type of processing to be performed on the data, the rate that data is read from or written to the buffer preferably varies accordingly. Therefore, it would be useful to provide a programming means to vary the rate of reading from or writing to the buffer to accommodate such cases.

OBJECTS AND SUMMARY OF THE INVENTION

Accordingly, it is an object of the present invention to provide an apparatus and method for limiting the rate of data transmission through a buffer or other unit for transferring data between source and destination of a data transmission.

Another object is to provide such an apparatus and method so that the maximum rate of data transmission is user programmable.

Another object is to provide such an apparatus and method so as to be configurable to accommodate design, manufacturing and/or specification differences between different model or part numbers.

These and additional objects are accomplished by the various aspects of the present invention, wherein briefly stated, one aspect is a rate limiting circuit for enabling an enable line to a unit for transferring data, comprising: a register storing a rate limiting parameter value; a clock generator generating a clock signal having a frequency related to the rate limiting parameter value; a counter incremented by the clock signal; and a controller enabling the access enable line to the unit if a count of the counter is greater than zero so that a data transmission rate associated with the unit is not greater than the frequency of the clock signal.

Another aspect is a rate limiting circuit for enabling an enable line to a unit for transferring data, comprising: a data storage unit storing a rate limiting parameter value; and logic coupled to the data storage unit and an input clock signal such that the logic enables the enable line at a rate between successive such enabling that is no greater than a maximum frequency equal to the reciprocal of the product of the period of the input clock signal times the sum of one plus the rate limiting parameter value.

Another aspect is a rate limiting circuit for enabling an enable line to a unit for transferring data, comprising: a first data storage unit storing a first rate limiting parameter value; a second data storage unit storing a second rate limiting parameter value; and logic coupled to the first data storage unit, the second data storage unit, and an input clock signal such that the logic enables the enable line at a rate between successive such enabling that is no greater than a maximum frequency equal to the reciprocal of the product of the period of the input clock signal times the sum of one plus the larger of the first and the second rate limiting parameter values.

Another aspect is a rate limiting circuit for enabling an enable line to a unit for transferring data, comprising: a first data storage unit storing a first rate limiting parameter value programmed by a user of the rate limiting circuit; a second data storage unit storing a second rate limiting parameter value programmed by a manufacturer of the rate limiting circuit; and logic coupled to the first and the second data storage units so as to enable the enable line at a rate between successive such enabling that is no greater than a maximum frequency determined from the larger of the first and the second rate limiting parameter values.

Still another aspect is a method for enabling an enable line to a unit for transferring data, comprising: reading a rate limiting parameter value from a register; and enabling the enable line at a rate between successive such enabling that is no greater than a maximum frequency determined from the rate limiting parameter value.

Yet another aspect is a method for enabling an enable line to a unit for transferring data, comprising: reading a first rate limiting parameter value from a first register; reading a second rate limiting parameter value from a second register; and enabling the enable line at a rate between successive such enabling that is no greater than a maximum frequency determined from the larger of the first rate limiting parameter value and the second rate limiting parameter value.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
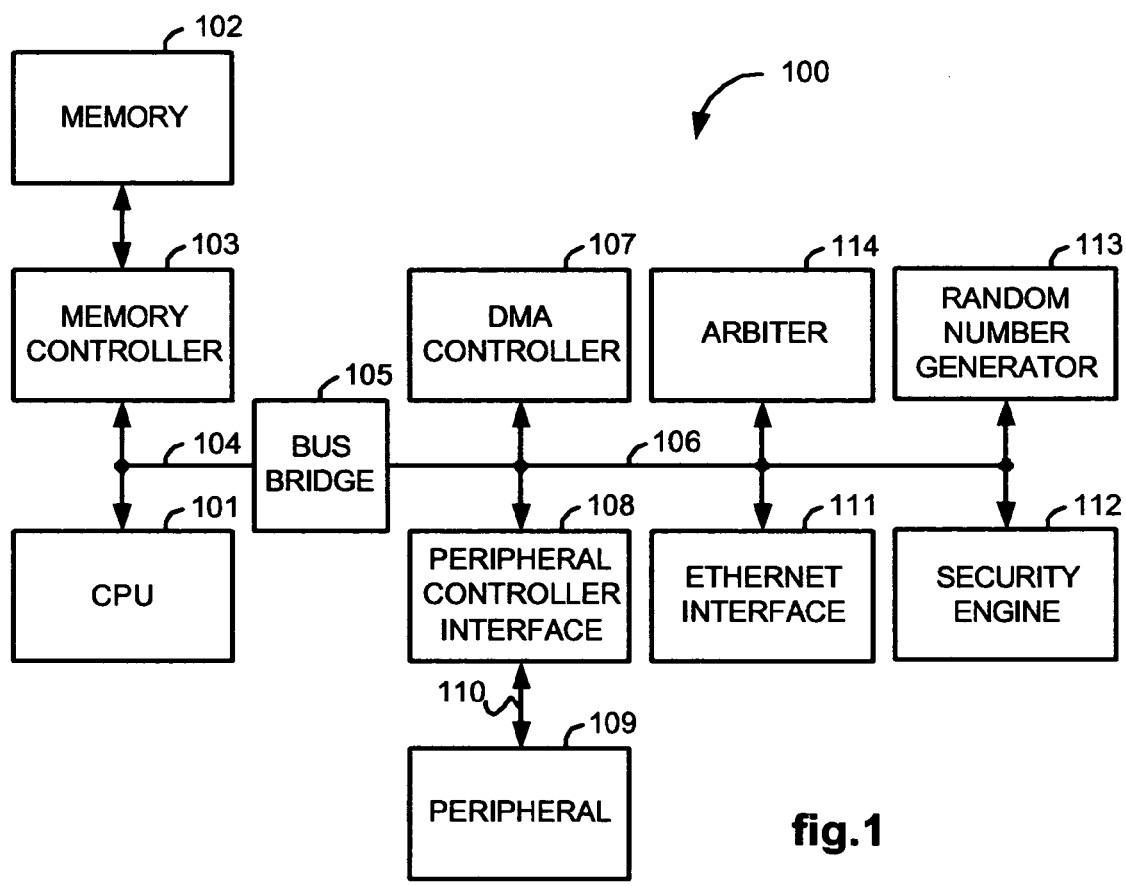
FIG. 1 illustrates a block diagram of a computer system utilizing aspects of the present invention.

FIG. 1 illustrates, as an example, a block diagram of a Computer System 100. The Computer System 100 conventionally includes a Central Processing Unit (CPU) 101, Memory 102 and Memory Controller 103 coupled through a System Bus 104. A Bus Bridge 105 couples the System Bus 104 to a Local Bus 106. A DMA Controller 107, Bus Arbiter 114, and Peripheral Controller Interface 108 are coupled to the Local Bus 106. A Peripheral 109 is conventionally coupled to the Peripheral Controller Interface 108 through a Peripheral Bus 110. An Ethernet Interface 111, Security Engine 112, and Random Number Generator 113 are also coupled to the Local Bus 106.

When data is transmitted from a source such as the Memory 102 to a destination such as the Security Engine 112, it may be advantageous to be able to programmably vary (i.e., through a pre-coded program or interactively through user input) the rate that such data is transmitted to or received by the destination. At times, it may also be advantageous to fix (e.g., through one-time-programming at manufacture) a maximum rate that such data is transmitted to or received by the destination.

Figure 2:
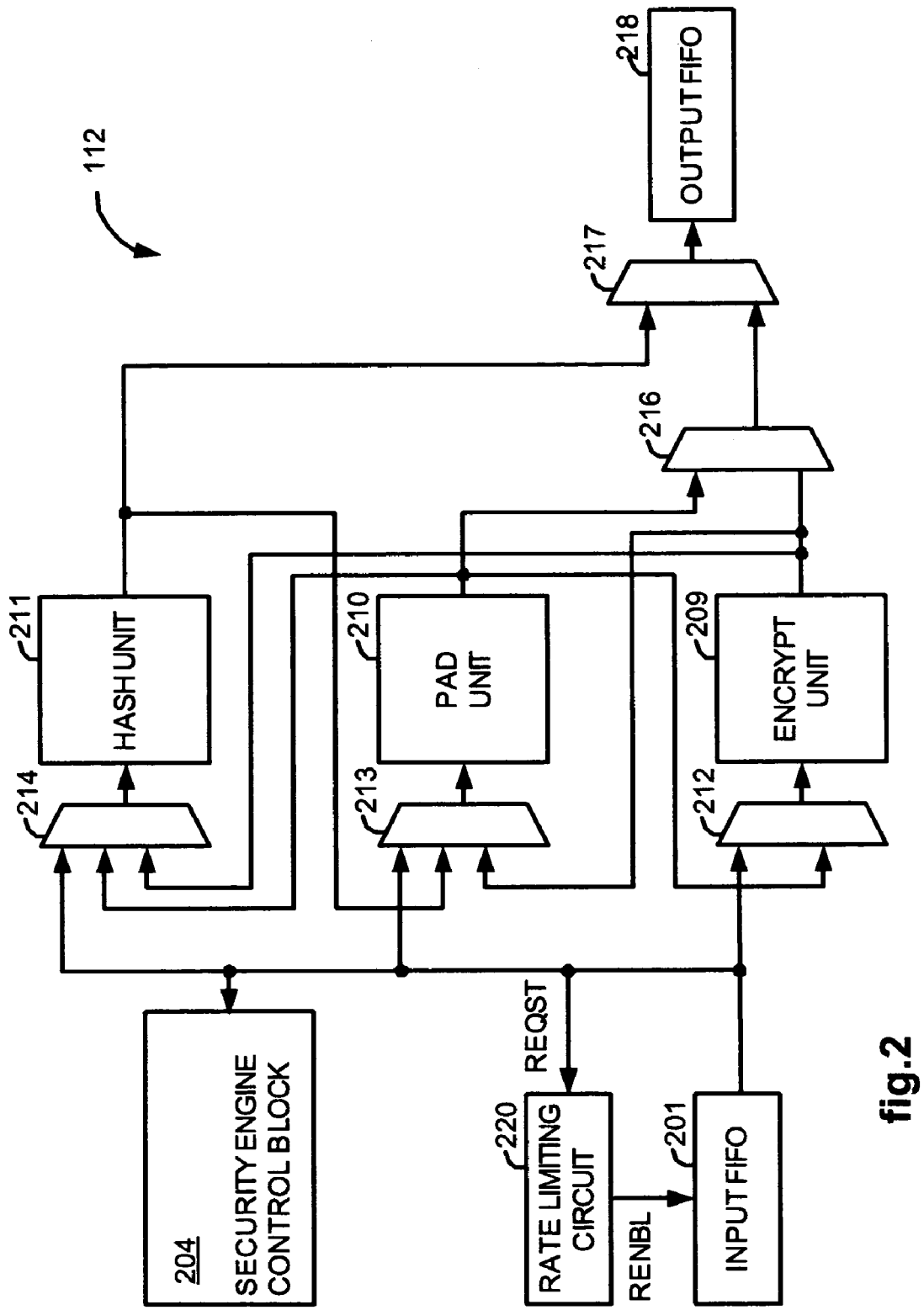
FIG. 2 illustrates a block diagram of a security engine including a rate limiting circuit utilizing aspects of the present invention.

FIG. 2 illustrates, as an example, a block diagram of the Security Engine 112. The Security Engine 112 includes an Input Buffer or FIFO 201 that buffers incoming data streams that are typically segmented into one or more packets from the Memory 102 under control of the CPU 101 or the DMA Controller 107 in a conventional DMA transfer. A Rate Limiting Circuit 220 coupled to the Input FIFO 201 controls the rate that data is read out of the Input FIFO 201. Also included is an Output Buffer or FIFO 218 that buffers the processed or outgoing data streams for transmission back to the Memory 102 under control of the CPU 101 or the DMA Controller 107.

An Encrypt Unit 209, Pad Unit 210 and Hash Unit 211 are also included as primary components of the Security Engine 112. The Encrypt Unit 209 performs data stream encryption and decryption. The Encrypt Unit 209 supports DES, Triple DES, AES-128, AES-192, and AES-256 algorithms in ECB and CBC modes. Encryption algorithms supported by the Encrypt Unit 209 are block ciphers which require data streams to consist of an integral number of blocks (DES and Triple DES require 8-byte blocks while AES-128, AES-192 and AES-256 require 16-byte blocks).

The Pad Unit 210 automatically inserts padding into data streams that are to be encrypted. For data streams that are decrypted, the Pad Unit 210 checks the data stream pad for consistency and optionally removes the padding from the data stream. The Pad Unit 210 supports eight popular padding algorithms, including those required by IPSec, SSL and TLS.

The Hash Unit 211 may be configured to compute an MD5, SHA-1, or SHA-256 one-way hash function, an Internet standard message authentication code (i.e., an RFC2104 HMAC) using one of these hash functions, or an SSLv3 Message Authentication Code (MAC) using either MD5 or SHA-1. The computed hash or MAC may be inserted or appended to the data stream and/or may be checked against a value in the data stream. The Hash Unit 211 includes two hash blocks (HMAC first stage and HMAC second stage) that implement a pipelined NMAC construct. When computing a hash, only the HMAC first stage is used. On the other hand, when computing an HMAC or SSLv3 MAC, both the HMAC first stage and HMAC second stage are used. The Hash Unit 211 also includes a trailer stage that is used for comparing the calculated hash value with information provided with or within the packet.

Also included in the Security Engine 112 are Multiplexers 212, 213, 214, 216, and 217 that facilitate the various operating modes of the Security Engine 112. The Security Engine Control Block 204 controls all component blocks of the Security Engine 112, including the Multiplexers 212, 213, 214, 216, and 217, in accordance with information included with or within individual data streams or packets.

Thus, it can be readily appreciated that the number of clock cycles required by the Security Engine 112 to process data varies not only by the nature or characteristics of the data being processed, but more significantly, by the type of processing that it is instructed to perform on the data (e.g., the type and length of the hashing, padding and encryption/decryption). For additional details on a similarly configured and operating security engine, see, e.g., commonly owned U.S. patent application Ser. No. 10/210,272 entitled "Pipelining Method and Apparatus for Processing Successive Packets through System Resources," which is incorporated herein by this reference.

Figure 3:
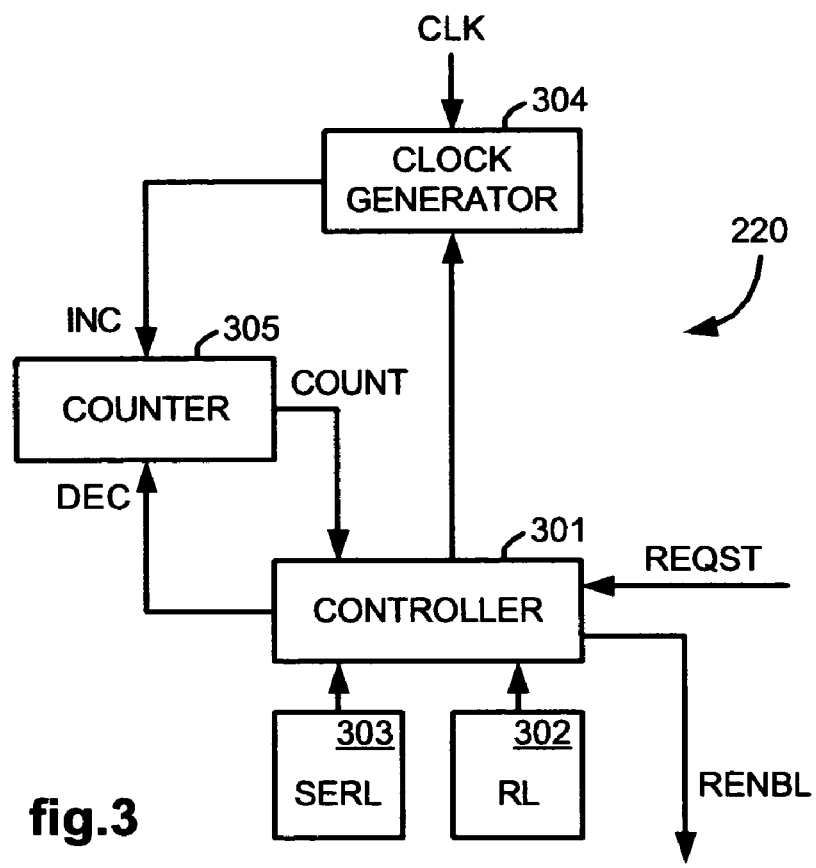
FIG. 3 illustrates a block diagram of a rate limiting circuit that enables a read enable line to an input buffer of a destination, utilizing aspects of the present invention.

FIG. 3 illustrates, as an example, a block diagram of the Rate Limiting Circuit 220. A Controller 301 reads a first rate limiting parameter value ("RL") from a First Register 302 and a second rate limiting parameter value ("SERL") from a Second Register 303.

The First Register 302 is electrically programmable and erasable so that it may be programmed and reprogrammed with appropriate values for the first rate limiting parameter. The Second Register 303, on the other hand, is a one-time-programmable memory which is programmed either electrically or through a metal mask pattern to include an appropriate value for the second rate limiting parameter during the manufacture of an integrated circuit or other device including the Rate Limiting Circuit 220.

Values for the first rate limiting parameter are generally user specified and programmed to accommodate particular characteristics of data transmitted to the Security Engine 112 for processing in the user's application, or the type of processing to be performed on the data. The value for the second rate limiting parameter, on the other hand, is generally manufacturer specified and programmed to accommodate design, manufacturing and/or specification differences between different model or part numbers for integrated circuits or other devices that include the Rate Limiting Circuit 220.

Although referred to herein as registers, the First and Second Registers, 302 and 303, may be any type of data storage units such as those commonly fabricated in integrated circuits as various types of memory. Further, they may be different data storage units as referred to herein, or different parts of the same data storage unit.

The Controller 301 passes the larger of the first and second rate limiting parameter values to a Clock Generator 304. The Clock Generator 304 then generates a clock signal ("MODCLK") from an input clock signal ("CLK") and the value passed to it from the Controller 301, having a period equal to:

$$T_{MODCLK} = T_{CLK} * [1 + MAX(RL, SERL)] \qquad (1)$$

where "$T_{CLK}$" is the period of the input clock signal CLK, and "MAX (RL, SERL)" is the larger of the first and second rate limiting parameter values passed to the Clock Generator 304 by the Controller 301. The input clock signal CLK in this example is the Local Bus 106 clock signal.

A Counter 305 receives the clock signal MODCLK from the Clock Generator 304 so that its count ("COUNT") is incremented by one each [1+MAX (RL, SERL)] cycles of the input clock signal CLK. For example, when the larger value of the first and second rate limiting parameters is equal to "1", then the Counter 305 is incremented by one every other cycle of the input clock signal CLK.

When the Controller 301 receives a request ("REQST") from the Security Engine Control Block 204 to read a word of data from the Input FIFO 201, the Controller 301 checks the current COUNT of the Counter 305 before activating a read enable line ("RENBL") to the Input FIFO 201. If the current COUNT is greater than zero, then the Controller 301 activates RENBL while decrementing the Counter 305 by one. If the current COUNT is zero, however, then the Controller 301 waits until the COUNT is greater than zero before activating RENBL to grant the request and decrement the Counter 305 by one. Consequently, the maximum rate at which the Controller 301 reads data from the Input FIFO 201 (and passes it to the destination) is:

$$f=1/(T_{MODCLK}) \qquad (2)$$

where the destination in this case is one or more of the Security Engine Control Block 204, Hash Unit 211, Pad Unit 210, and Encrypt Unit 209 of the Security Engine 112.

For a high performance Security Engine 112, the Rate Limiting Circuit 220 may be modified by its manufacturer by either eliminating the second register 303 or storing a zero value in it. In this case, the period of the clock signal MODCLK generated by the Clock Generator 304 is:

$$T_{MODCLK}=T_{CLK}*[1+RL] \qquad (3)$$

and the maximum rate at which the Controller 301 reads data from the Input FIFO 201 (and passes it to the destination) is determined again by equation (2) above.

Figure 4:
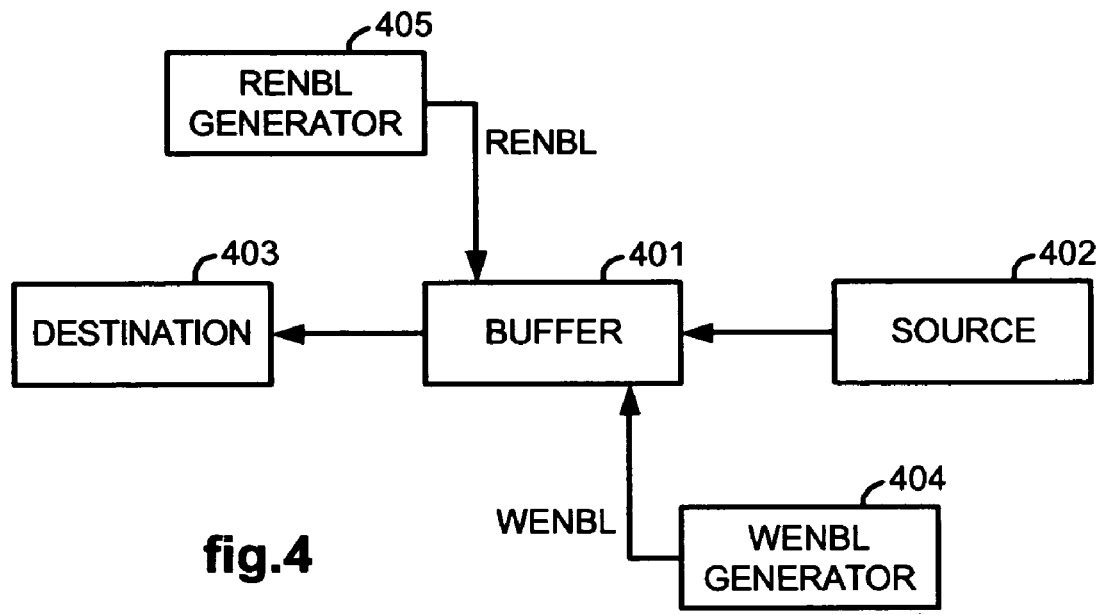
FIG. 4 illustrates a block diagram of a buffer interposed between source and destination in a computer system or between computer systems, utilized in aspects of the present invention.

FIG. 4 illustrates, as an example, a Buffer 401 interposed between Source 402 and Destination 403 for buffering data transmissions between the two. The Buffer 401 may be an input buffer for the Destination 403 such as the Input FIFO 201 of the Security Engine 112, or an output buffer for the Source 402. In either case, the Rate Limiting Circuit 220 may be used as Read Enable Logic 405 that controls the rate that data is read from the Buffer 401 (by activating its read enable line RENBL), or it may be used as Write Enable Logic 404 that controls the rate that data is written into the Buffer 401 (by activating its write enable line WENBL). As used herein, the term "enable line" means either the read enable line RENBL or the write enable line WENBL, depending upon whether data is being read from or written to the Buffer 401.

Although the various aspects of the present invention have been described with respect to a preferred embodiment, it will be understood that the invention is entitled to full protection within the full scope of the appended claims. As one example, although use of the rate limiting circuit of the present invention is described as reducing the rate that data is read from a buffer, it is also applicable and useful for reducing the rates associated with other units for transferring data such as the DMA Controller 107 of FIG. 1 with the enable line serving to grant in that case the transfer of a block of data.

We claim:

1. A rate limiting circuit for enabling an enable line to a unit for transferring data, comprising:
    a register storing a rate limiting parameter value;
    a clock generator generating a clock signal having a frequency related to the rate limiting parameter value;
    a counter incremented by the clock signal; and
    a controller enabling the enable line to the unit if a count of the counter is greater than zero so that a data transmission rate associated with the unit is not greater than the frequency of the clock signal.

2. The rate limiting circuit according to claim 1, wherein if the count of the counter is not greater than zero at the time of receiving a request to access the unit, the controller waits until the count is greater than zero before enabling the enable line.

3. The rate limiting circuit according to claim 1, wherein the controller decrements the counter by a count of one each time it enables the enable line.

4. The rate limiting circuit according to claim 1, wherein the register is electrically programmable.

5. The rate limiting circuit according to claim 4, wherein the register is electrically erasable.

6. The rate limiting circuit according to claim 1, wherein the register is programmed by a metal mask pattern during fabrication of the rate limiting circuit.

7. The rate limiting circuit according to claim 1, wherein the unit for transferring data is a buffer.

8. The rate limiting circuit according to claim 7, wherein the enable line is a read enable line used to read contents of the buffer.

9. The rate limiting circuit according to claim 7, wherein the enable line is a write enable line used to write data into the buffer.

10. The rate limiting circuit according to claim 1, wherein the unit for transferring data is a DMA controller.

11. The rate limiting circuit according to claim 1, wherein the controller reads the rate limiting parameter value from the register and provides it to the clock generator so that the clock generator generates the clock signal having the frequency related to the rate limiting parameter value.

12. The rate limiting circuit according to claim 11, wherein the clock generator generates the clock signal from an input clock signal, and the frequency of the clock signal generated by the clock generator is equal to the reciprocal of a product of the period of the input clock signal times the sum of one plus the rate limiting parameter value.

13. The rate limiting circuit according to claim 1, further comprising a second register storing a second rate limiting parameter value, wherein the frequency of the clock signal generated by the clock generator is related to the larger of the rate limiting parameter value and the second rate limiting parameter value.

14. The rate limiting circuit according to claim 13, wherein the second register is a one-time programmable memory.

15. The rate limiting circuit according to claim 13, wherein the rate limiting circuit is included in an integrated circuit device and the second register is programmed during manufacture of the integrated circuit device.

16. The rate limiting circuit according to claim 15, wherein the second register is programmed by a metal mask pattern during fabrication of the integrated circuit device.

17. The rate limiting circuit according to claim 13, wherein the controller reads the rate limiting parameter value from the register and the second rate limiting parameter value from the second register, and provides the larger of rate limiting parameter value and the second rate limiting parameter value to the clock generator so that the clock generator generates the clock signal having the frequency related to the larger of the rate limiting parameter value and the second rate limiting parameter value.

18. The rate limiting circuit according to claim 17, wherein the clock generator generates the clock signal from an input clock signal, and the frequency of the clock signal generated by the clock generator is equal to the reciprocal of a product of the period of the input clock signal times the sum of one plus the larger of the rate limiting parameter value and the second rate limiting parameter value.

19. A rate limiting circuit for enabling an enable line to a unit for transferring data, comprising:
   a data storage unit storing a rate limiting parameter value; and
   logic coupled to the data storage unit and an input clock signal such that the logic enables the enable line at a rate between successive such enabling that is no greater than a maximum frequency equal to the reciprocal of a product of the period of the input clock signal times the sum of one plus the rate limiting parameter value.

20. The rate limiting circuit according to claim 19, wherein the data storage unit is electrically programmable.

21. The rate limiting circuit according to claim 19, wherein the data storage unit is electrically erasable.

22. The rate limiting circuit according to claim 19, wherein the data storage unit is programmed by a metal mask pattern during manufacture of the rate limiting circuit.

23. The rate limiting circuit according to claim 19, wherein the unit for transferring data is a buffer.

24. The rate limiting circuit according to claim 23, wherein the enable line is a read enable line used to read contents of the buffer.

25. The rate limiting circuit according to claim 23, wherein the enable line is a write enable line used to write data into the buffer.

26. A rate limiting circuit for enabling an enable line to a unit for transferring data, comprising:
   a first data storage unit storing a first rate limiting parameter value;
   a second data storage unit storing a second rate limiting parameter value; and
   logic coupled to the first data storage unit, the second data storage unit, and an input clock signal such that the logic enables the enable line at a rate between successive such enabling that is no greater than a maximum frequency equal to the reciprocal of a product of the period of the input clock signal times the sum of one plus the larger of the first and the second rate limiting parameter values.

27. The rate limiting circuit according to claim 26, wherein the first data storage unit is electrically erasable and electrically programmable, and the second data storage unit is one-time programmable memory programmed during manufacture of a device including the rate limiting circuit.

28. The rate limiting circuit according to claim 26, wherein the unit for transferring data is a buffer.

29. The rate limiting circuit according to claim 28, wherein the enable line is a read enable line used to read contents of the buffer.

30. The rate limiting circuit according to claim 28, wherein the enable line is a write enable line used to write data into the buffer.

31. A rate limiting circuit for enabling an enable line to a unit for transferring data, comprising:
   a first data storage unit storing a first rate limiting parameter value programmed by a user of the rate limiting circuit;
   a second data storage unit storing a second rate limiting parameter value programmed by a manufacturer of the rate limiting circuit; and
   logic coupled to the first and the second data storage units so as to enable the enable line at a rate between successive such enabling that is no greater than a maximum frequency determined from the larger of the first and the second rate limiting parameter values.

32. The rate limiting circuit according to claim 31, wherein the first data storage unit is electrically erasable and electrically programmable, and the second data storage unit is an one-time programmable memory programmed during manufacture of a device including the rate limiting circuit.

33. The rate limiting circuit according to claim 31, wherein the unit for transferring data is a buffer.

34. The rate limiting circuit according to claim 33, wherein the enable line is a read enable line used to read contents of the buffer.

35. The rate limiting circuit according to claim 33, wherein the enable line is a write enable line used to write data into the buffer.

36. A method for enabling an enable line to a unit for transferring data, comprising:
   reading a rate limiting parameter value from a register;
   receiving an input clock signal characterized by a period; and
   enabling the enable line at a rate between successive such enabling that is no greater than a maximum frequency determined from the rate limiting parameter value, wherein the maximum frequency is equal to the reciprocal of the product of the period of the input clock signal times the sum of one plus the rate limiting parameter.

37. The method according to claim 36, further comprising reading a second rate limiting parameter value from a second register, wherein the maximum frequency is equal to the reciprocal of the product of the period of the input clock signal times the sum of one plus the larger of the rate limiting parameter value and the second rate limiting parameter value.

38. The method according to claim 37, further comprising writing the rate limiting parameter value into the register.

39. The method according to claim 38, further comprising programming the second rate limiting parameter value into the second register on a one-time-programmable basis.

40. The method according to claim 39, wherein the programming of the second rate limiting parameter value is performed during the manufacture of a device including the second register.

41. A method for enabling an enable line to a unit for transferring data, comprising:
   reading a first rate limiting parameter value from a first register;
   reading a second rate limiting parameter value from a second register; and
   enabling the enable line at a rate between successive such enabling that is no greater than a maximum frequency determined from the larger of the first rate limiting parameter value and the second rate limiting parameter value.

* * * * *